(12) United States Patent
Numata et al.

(10) Patent No.: US 11,554,410 B2
(45) Date of Patent: Jan. 17, 2023

(54) MOLD RELEASE AGENT COMPOSITION AND DIE CASTING METHOD

(71) Applicant: YUSHIRO CHEMICAL INDUSTRY CO., LTD., Tokyo (JP)

(72) Inventors: Yasunori Numata, Kanagawa (JP); Koji Soga, Kanagawa (JP); Shinsuke Morimoto, Kanagawa (JP); Yasuhiro Hattori, Kanagawa (JP)

(73) Assignee: Yushiro Chemical Industry Co., Ltd., Tokyo (JP)

( * ) Notice: Subject to any disclaimer, the term of this patent is extended or adjusted under 35 U.S.C. 154(b) by 0 days.

(21) Appl. No.: 16/772,450

(22) PCT Filed: Aug. 30, 2018

(86) PCT No.: PCT/JP2018/032205
§ 371 (c)(1),
(2) Date: Jun. 12, 2020

(87) PCT Pub. No.: WO2019/234947
PCT Pub. Date: Dec. 12, 2019

(65) Prior Publication Data
US 2020/0391278 A1    Dec. 17, 2020

(30) Foreign Application Priority Data
Jun. 5, 2018    (JP) .............................. JP2018-107665

(51) Int. Cl.
*B22C 3/00*    (2006.01)
*B22C 23/02*    (2006.01)
(Continued)

(52) U.S. Cl.
CPC ................ *B22C 3/00* (2013.01); *B22C 23/02* (2013.01); *B22D 17/2007* (2013.01); *C08F 8/14* (2013.01);
(Continued)

(58) Field of Classification Search
CPC .............. C10M 173/00; C10M 107/50; C10M 145/22; C10M 2229/025; C10M 2229/041;
(Continued)

(56) References Cited

U.S. PATENT DOCUMENTS

| | | | |
|---|---|---|---|
| 5,865,884 A | 2/1999 | Sagawa et al. | |
| 2009/0186787 A1* | 7/2009 | Scherer | ................ C10M 105/42 508/304 |

(Continued)

FOREIGN PATENT DOCUMENTS

| | | | |
|---|---|---|---|
| CN | 101554642 A | 10/2009 | |
| CN | 101827910 A | 9/2010 | |

(Continued)

OTHER PUBLICATIONS

International Search Report for PCT/JP2018/032205 dated Oct. 2, 2018 (PCT/ISA/210).

*Primary Examiner* — Vishal V Vasisth
(74) *Attorney, Agent, or Firm* — Sughrue Mion, PLLC

(57) ABSTRACT

Provided is a mold release agent composition containing a polymer ester, the composition exerting a good mold releasability even when the temperature of mold increases, and a die casting method using the composition.

11 Claims, 1 Drawing Sheet

(51) Int. Cl.
*B22D 17/20* (2006.01)
*C10M 107/50* (2006.01)
*C10M 145/22* (2006.01)
*C08G 63/12* (2006.01)
*C08F 8/14* (2006.01)

(52) U.S. Cl.
CPC ........... *C08G 63/12* (2013.01); *C10M 107/50* (2013.01); *C10M 145/22* (2013.01)

(58) Field of Classification Search
CPC ...... C10M 2207/28; C10M 2205/0285; C10M 2203/10; C10M 2207/026; C10M 2203/1006; C10M 2209/1023; C10M 2207/283; C10M 2219/068; C10M 2207/301; C10M 2209/104; C10M 2223/045; C10M 2209/0806; C10M 2209/108; C10N 2040/36; C10N 2020/02; C10N 2020/04; C10N 2010/12; B22C 3/00; B22C 23/02; B22D 17/2007; B22D 17/20; C08G 63/12; C08F 8/14
See application file for complete search history.

(56) References Cited

U.S. PATENT DOCUMENTS

| | | |
|---|---|---|
| 2012/0184474 A1 | 7/2012 | Kawata et al. |
| 2012/0208939 A1 | 8/2012 | Aoki et al. |
| 2014/0224444 A1* | 8/2014 | Burke .................... B22D 17/22 164/72 |
| 2018/0117667 A1 | 5/2018 | Suzuki et al. |

FOREIGN PATENT DOCUMENTS

| | | |
|---|---|---|
| JP | 7-109421 A | 4/1995 |
| JP | 10-081892 A | 3/1998 |
| JP | 4095102 B2 | 6/2008 |
| JP | 2011-089106 A | 5/2011 |
| JP | 2015-142938 A | 8/2015 |
| WO | 2016/208743 A1 | 12/2016 |

\* cited by examiner

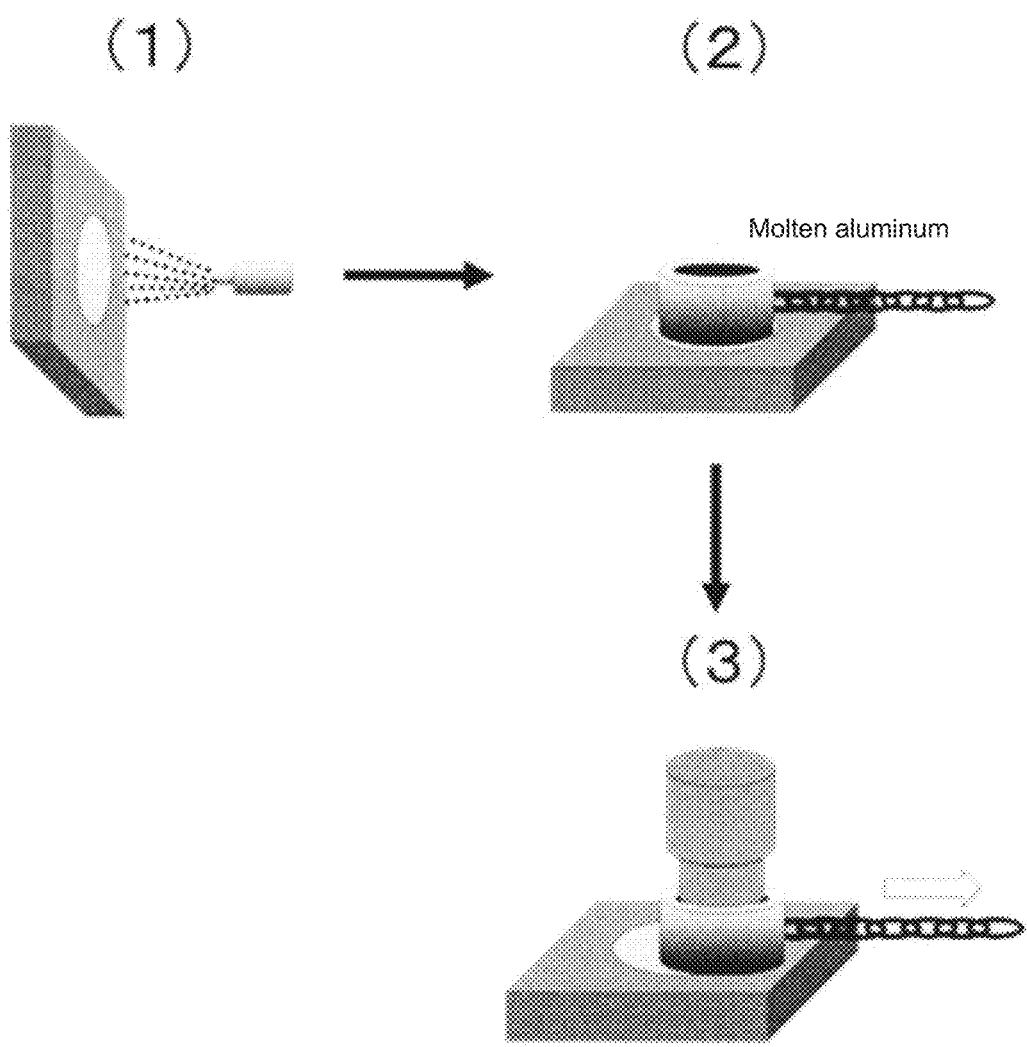

MOLD RELEASE AGENT COMPOSITION AND DIE CASTING METHOD

CROSS REFERENCE TO RELATED APPLICATIONS

This application is a National Stage of International Application No. PCT/JP2018/032205 filed Aug. 30, 2018, claiming priority based on Japanese Patent Application No. 2018-107665, filed Jun. 5, 2018.

FIELD

The present application relates to mold release agent compositions and die casting methods.

BACKGROUND

In die casting, for lubrication of cavities in molds, mold release agents are applied in a form of spray after mold opening, to form an oil film on the surfaces of the cavities. By this, welding of molten nonferrous metals such as aluminum, magnesium, zinc, etc. to the cavities is prevented, which enables continuous casting. The mold release agents for die casting are classified roughly into oil-based release agents and water-soluble release agents. In view of productivity, safety, and work environment, water-soluble release agents are used a lot recently. Oil-based release agents, which have high lubricating property, are used in a field where a high lubricating property is required as limited use application.

Oil-based release agents, having high viscosity, tend to have a bad spray property. Patent Literature 1 discloses an oil-based release agent in which the spray property is improved.

CITATION LIST

Patent Literature

Patent Literature 1: JP 4095102 B

SUMMARY

Technical Problem

Die casting is a method in which molten metal is poured with pressure, and it is a casting method with which a large number of products can be made in a short time. However, there was a problem in the release agent of Patent Literature 1 that the mold releasability degrades when the cycle time is shortened to improve productivity, because the temperature of mold increases.

Accordingly, an object of the present application is to provide a mold release agent composition that can exert a good mold releasability even when the temperature of the mold increases, and a die casting method using the composition.

Solution to Problem

As a result of intensive studies, the inventors of the present application found that a mold release agent composition containing polymer esters can exert good mold releasability even when the temperature of the mold increases.

The present application discloses, as a first aspect, a mold release agent composition including a polymer ester.

In the mold release agent composition of the first aspect, it is preferred that the polymer ester include a dibasic acid or an alcohol as its structural unit.

In the mold release agent composition of the first aspect, it is preferred that the polymer ester include, as a structural unit, a dibasic acid, a monobasic acid, and a polyhydric alcohol, having a polymer backbone of a polyester structure obtained by carrying out dehydration condensation on the dibasic acid and the polyhydric alcohol, and a polymer side chain of an ester structure obtained by carrying out dehydration condensation on an alcohol residue derived from the polyhydric alcohol and the monobasic acid.

In the mold release agent composition of the first aspect, it is preferred that the polymer ester include, as a structural unit, a dibasic acid, a monohydric alcohol, and a olefin, the dibasic acid is an unsaturated dicarboxylic acid, the polymer ester include a polymer backbone obtained by copolymerization by addition polymerization of the unsaturated dicarboxylic acid and a olefin, and include a polymer side chain of an ester structure obtained by dehydration condensation of the carboxylic acid of the unsaturated dicarboxylic acid and the monohydric alcohol.

In the mold release agent composition of the first aspect, it is preferred that the polymer ester have a weight average molecular weight of 3,000 to 160,000.

In the mold release agent composition of the first aspect, it is preferred that the polymer ester have a kinematic viscosity at 100° C. of 100 to 5,000 mm$^2$/s.

In the mold release agent composition of the first aspect, it is preferred that the content of the polymer ester be, on the basis of the total mass of the mold release agent, 0.1 to 20 mass %.

In the mold release agent composition of the first aspect, it is preferred that the mold release composition further include a silicone oil, and the content of the silicone oil be, on the basis of the total mass of the mold release agent, no more than 50 mass %.

The present application discloses, as a second aspect, the mold release agent composition of the first aspect, further including a hydrocarbon solvent (oily).

The present application discloses, as a third aspect, the mold release agent composition of the first aspect, further including a surfactant and water (aqueous). It is preferred that the mold release agent composition of the third aspect be formed to be emulsified.

The present application discloses, as a fourth aspect, a die casting method including a step of applying the mold release agent composition (oily) of the second aspect to a mold via spray nozzles, having an application amount of the mold release agent composition (oily) of 0.00005 ml/cm$^2$ to 0.1 ml/cm$^2$.

The present application is, as a fifth aspect, the die casting method including a step of applying the mold release agent composition (aqueous) of the third aspect, wherein the amount of the mold release agent composition (aqueous) is, as an application amount of the polymer ester, 0.01 mg/cm$^2$ to 50 mg/cm$^2$.

Advantageous Effects of Invention

According to the mold release composition of the present disclosure, it is possible to exert a good mold releasability even with a high-temperature mold, which eliminates the necessity of cooling the mold, whereby it is possible to improve the productivity with a shortened cycle time.

BRIEF DESCRIPTION OF DRAWINGS

FIG. 1 is a view to explain steps of evaluating moldability at a high temperature.

DETAILED DESCRIPTION OF EMBODIMENTS

Hereinafter, the mold release agent composition of the present disclosure will be explained as one example of the embodiments. However, the claims of the present application are not limited to the embodiments explained below.

In the following embodiments, the expression "X to Y" (X and Y are arbitrary numbers), unless otherwise specified, encompasses the meaning of "no less than X and no more than Y" as well as "preferably larger than X" and "preferably smaller than Y". In the following embodiments, the expression "no less than X" (X is an arbitrary number), unless otherwise specified, encompasses the meaning of "preferably larger than X" and the expression "no more than Y" (Y is an arbitrary number), unless otherwise specified, encompasses the meaning of "preferably smaller than Y".

Mold Release Composition

The mold release agent composition of the present disclosure includes a polymer ester.

(Structure of Polymer Ester)

The polymer ester contained in the mold release agent composition is a polymer compound having an ester bond, may be a polyester having an ester group at the main chain of polymer, and may be a polymer having an ester group at a side chain.

It is preferred that the polymer ester include, as the structure unit (precursor or monomer), a dibasic acid and alcohol. As the dibasic acid, preferred are $C_3$-$C_{10}$ dibasic acids, more preferred are $C_3$-$C_8$ dibasic acids, and still preferred are $C_4$-$C_6$ dibasic acids. The dibasic acid may be saturated or unsaturated, may be aliphatic or aromatic, and may be linear or branched. It is preferred that aliphatic dicarboxylic acids be used as the dibasic acid. Specific examples of aliphatic dicarboxylic acid include adipic acid, fumaric acid, succinic acid, glutaric acid, suberic acid, sebacic acid, maleic acid, and glutaconic acid. Specific examples of aromatic dicarboxylic acid include terephthalic acid and isophthalic acid.

As the alcohol, monohydric alcohols or polyhydric alcohols may be used. As the monohydric alcohol, preferably $C_1$-$C_{10}$ aliphatic alcohols, more preferably $C_2$-$C_9$ aliphatic alcohols, and still preferably $C_4$-$C_8$ aliphatic alcohols may be used. The monohydric alcohol may be liner or branched, and a mixture of two or more kinds may be used. For example, 1-butanol, 2-etylhexanol, 1-hexanol, 1-octanol, isooctanol, and isohexanol may be raised. As the polyhydric alcohols, preferably $C_3$-$C_8$ aliphatic alcohols, more preferably $C_4$-$C_7$ aliphatic alcohols, still more preferably $C_5$-$C_6$ aliphatic alcohols may be used. Preferably dihydric to pentahydric alcohols may be used, and more preferably trihydric to tetrahydric alcohols may be used. For example, pentaerythritol, trimethylolpropane, neopentylglycol, and glycerin may be used.

Hereinafter, as the polymer ester which can be used in the mold release composition of the present disclosure, "first polymer ester" and "second polymer ester" will be explained.

(First Polymer Ester)

The first polymer ester includes the above-described dibasic acid and the polyhydric alcohol, and further includes a monobasic acid, as the structure unit (precursor or monomer). As the monobasic acid, preferred are $C_3$-$C_{22}$ fatty acids, more preferred are $C_4$-$C_{20}$ fatty acids, further preferred are $C_6$-$C_{19}$ fatty acids, and still further preferred are $C_8$-$C_{18}$ fatty acids. The fatty acids may be linear or branched, and may be saturated or unsaturated. The unsaturated fatty acid may be monovalent or polyvalent. The fatty acids may be synthesized or natural, and a mixture of two or more kinds may be used. Specific examples include caprylic acid, capric acid, lauric acid, myristic acid, palmitic acid, stearic acid, oleic acid, linoleic acid, coconut oil fatty acid, palm oil fatty acid, rapeseed oil fatty acid, isooctanoic acid, isononanoic acid, isodecanoic acid, isoundecanoic acid, and isododecanoic acid.

It is preferred that the first polymer ester include a polyester structure obtained by carrying out dehydration condensation on the above-described dibasic acid and polyhydric alcohol at the polymer backbone, and include an ester structure obtained by carrying out dehydration condensation on an alcohol residue derived from the polyhydric alcohol and the above-described monobasic acid at the side chain.

Specifically, the following polymer esters may be exemplified as the first polymer ester.

a polymer ester in which adipic acid is used as the dibasic acid and pentaerythritol is used as the polyhydric acid, having a polyester structure as the polymer backbone obtained by carrying out dehydration condensation on the adipic acid and the pentaerythritol, and in which $C_{18}$ unsaturated fatty acid or $C_8$-$C_{10}$ branched fatty acid is used as the monobasic acid, and having an ester structure obtained by dehydration condensation of the monobasic acid and an alcohol residue of the pentaerythritol at the side chain a polymer ester in which adipic acid is used as the dibasic acid and trimethylolpropane is used as the polyhydric acid, having a polymer backbone of a polyester structure obtained by dehydration condensation of the adipic acid and the trimethylolpropane and in which palm oil fatty acid is used as the monohydric acid, having a side chain of an ester structure obtained by dehydration condensation of the palm oil fatty acid and an alcohol residue of trimethylolpropane As the structure component (copolymer component or blend component) of the first polymer ester, a poly-α-olefin such as polybutene, polyisobutylene, 1-hexenoligomar, 1-octenolygomar, and 1-decenolygomar may be included.

(Second polymer ester)

The second polymer ester includes, as its structural unit (precursor or monomer), monohydric alcohol and α olefin in addition to the above-described dibasic acid, and is a polymer ester having unsaturated dicarboxylic acid as the dibasic acid. It is preferred that the second polymer ester include a polymer backbone obtained by copolymerization by addition polymerization of unsaturated dicarboxylic acid and α olefin. In addition, it is preferred that the second polymer ester include an ester structure in the polymer side chain which is obtained by dehydration condensation of the carboxylic acid of the unsaturated dicarboxylic acid and the monohydric alcohol.

Specific examples of the second polymer ester include the following polymer ester.

a polymer ester in which fumaric acid is used as the dibasic acid, 1-butanol, 2-etylhexanol or the like is used as the monohydric acid, having a polymer backbone of a copolymer obtained by addition polymerization of fumaric acid and α olefin, and having an ester structure which is obtained by dehydration condensation of the carboxylic acid of fumaric acid and the monohydric alcohol in the side chain.

As the α olefin, preferably $C_8$-$C_{18}$ linear or branched α olefin is used. For example, 1-dodecene, 1-tetradecene, 1-hexadecene, and 1-octadecene may be used.

(Weight Average Molecular Weight of Polymer Ester)

The weight average molecular weight of the polymer ester is preferably 3,000 to 160,000, more preferably 10,000 to 100,000, and further preferably 40,000 to 80,000.

(Kinematic Viscosity of Polymer Ester)

The kinematic viscosity of the polymer ester at 100° C. is preferably 100 to 5,000 $mm^2/s$, more preferably 200 to 2,000 $mm^2/s$, and further preferably 200 to 1,000 $mm^2/s$.

(Content of Polymer Ester)

The content of the polymer ester is, on the basis of the total mass of the mold release agent composition (100 mass %), preferably 0.1 to 20 mass %, more preferably 0.1 to 10 mass %, and further preferably 1 to 5 mass %. Containing no less than 0.1 mass % of the polymer ester can exert an effect to improve the heat resistance of the mold release agent, and containing no more than 20 mass % of the polymer ester can have a good liquid stability of the mold release agent.

(Silicone Oil)

It is preferred that the mold release agent of the present disclosure further include a silicone oil. As the silicone oil, known silicone compounds such as silicone oils and silicone waxes may be used. Specific examples thereof include dimethyl silicone, cyclic silicone, methylphenylsilicone, methylhydrogensilicone and organo modified silicone compounds. As the organo modified silicone compounds, organopolysiloxane partly or totally modified by alkyl group, aralkyl group, amino group, carboxylalkyl group or carboxylic acid alkyl group, hydroxyalkyl group, aminoalkyl group, or polyether group, and the like may be exemplified. These silicone oils may be used alone, or two or more of them may be used in combination.

It is preferred that the content of the silicone oil be 5 to 50 mass % on the basis of the total mass of the composition. Having the content of the silicone oil within the above range makes it possible to add a proper mold releasabilty to the composition and to prevent burn-in.

(Other Additives)

The mold release agent composition of the present disclosure may contain, as other additives, mineral oils, grease, synthetic ester oils, oiliness agents, synthetic waxes, etc., for the purpose of obtaining lubrication to the mold release agent composition. Examples of the other additives may include defoaming agents, foaming agents, drying accelerators, corrosion inhibitors, preservatives, anti-rusts, thickeners, antioxidants, radical scavengers, and radical auxiliary agents.

Oily Mold Release Agent

The mold release agent of the present disclosure may be oiliness or aqueous. It is preferred that the mold release agent further include a hydrocarbon solvent when the agent is oiliness.

(Hydrocarbon Solvent)

The hydrocarbon solvent is not particularly limited, and it is preferred that paraffins having a flame point of no less than 70° C. be used in view of easy handling. The content of the hydrocarbon solvent is not particularly limited, and it may be used at from very low concentration (no less than 1 mass %) to very high concentration (99 mass %). As a preferred content, the lower limit is preferably no less than 40 mass % on the basis of whole composition, and the upper limit is preferably no more than 90 mass %. Less than 40 mass % of the content of the hydrocarbon solvent causes uneven coating because mold release components such as polymer ester become too thick. On the other hand, more than 90 mass % of the content of the hydrocarbon solvent may cause burn-in because of insufficient coating of the mold release components to molds.

Aqueous Mold Release Composition

When the mold release composition of the present disclosure is used as aqueous, it is preferred the mold release composition further contain a surfactant and water. It is also preferred that the composition be formed to be emulsified. The emulsified composition has dispersed and stable polymer esters, which reduces unevenness and distribution of mold releasability.

(Surfactant)

The kind of the surfactant is not particularly limited as long as it can emulsify the polymer esters and silicone oil etc. in stable manner. For example, any of anionic, cationic, both anionic and cationic, and nonionic surfactants may be used. Among them, nonionic surfactants are preferable. Specifically, polyoxylalkylene glycol, polyoxylalkylene alkylether, and the like are preferable. These surfactants may be used alone, or two or more kinds may be used in combination.

The HLB of the surfactant is preferably 5 to 15 and more preferably 8 to 12.

In view of emulsifying the polymer ester and silicone oil in stable manner, it is preferred that the lower limit of the content of the surfactant be no less than 0.1 mass % on the basis of the whole composition. The content is preferably no less than 1 mass %, and the upper limit is preferably no more than 10 mass %.

As the water, any of pure water, ion-exchange water, tap water, etc. may be used.

Production Method of Mold Release Agent Composition

Examples of a method for producing an oily mold release agent composition include solving polymer esters and other optional components such as silicone oil and like in a solvent. Examples of a method for producing an aqueous mold release agent include mixing polymer esters, other optional components such as silicone oil and the like, water, and a surfactant. As a method for emulsifying the aqueous mold release agent, a known method (JP 2002-18805 A) used in manufacturing an aqueous mold release agent may be employed.

Die Casting Method Using Mold Release Agent Composition

The mold release agent composition of the present disclosure may be used for applications in a common amount and applications in a small amount. Nowadays, in order to improve productivity by shortening cycle time and to reduce impact to environment by reducing waste liquids, reduction of the application amount of mold release agents are considered. On the other hand, the case in which mold release agents are used under conditions where molds reach a high temperature of no less than 250° C. is increasing, and reducing the application amount of the mold release agent might cause insufficient cooling effect which causes the temperature of the mold to be higher. The mold release agent composition of the present disclosure has a mold releasability at a high temperature, and thus the composition may be used for an application in a small amount under a high temperature condition.

When an oily mold release agent composition is used, the application amount for a mold is, in the step of applying the mold release agent composition to the mold via spray nozzles for example, preferably 0.00005 ml/cm² to 0.1 ml/cm², more preferably 0.0001 ml/cm² to 0.05 ml/cm², and further preferably 0.0003 ml/cm² to 0.005 ml/cm².

When the aqueous mold release agent composition is used, the application amount for a mold is, in the step of applying the mold release agent composition to the mold via spray nozzles for example, preferably 0.001 ml/cm² to 0.1 ml/cm², and more preferably 0.003 ml/cm² to 0.05 ml/cm².

When the aqueous mold release agent composition is used, not only by the above-described application in a small amount, but also by an application in a large amount with attenuated concentration of the aqueous mold release agent composition may be made. As the amount of undiluted solution of the mold release agent composition, the application amount of the polymer ester to a mold for example is preferably 0.01 mg/cm² to 50 mg/cm², and more preferably 0.1 mg/cm² to 10 mg/cm².

EXAMPLES

Examples 1 to 7 and Comparative Example 1

(Preparation of Oily Mold Release Agent Composition)

Oily mold release agent compositions of Examples 1 to 7 and Comparative example 1 were prepared with the components (mass %) shown in Table 1. The mold releasability of each oily mold release agent composition at 350° C. and 400° C. was evaluated. The evaluation method of the mold releasability will be explained later aqueous mold release agent composition at 300° C. was evaluated. The evaluation method of the mold releasability will be explained later.

TABLE 2

|  | Examples | | Comp. Example |
|---|---|---|---|
|  | 8 | 9 | 2 |
| Polymer ester A | 4 | — | — |
| Polymer ester A | — | 4 | — |
| Silicone oil | | 20 | |
| Synthetic ester | | 2.5 | |
| Mineral oil | | 2.5 | |
| EO isodecyl ether (HLB: 10.5) | | 3 | |
| Water | 68 | 68 | 72 |
| Total | | 100 | |
| Moldability (300° C., kg) | 11 | 15 | 20 |

Polymer esters A, B, C, and D in Tables 1 and 2 have the following structures. Polymer ester A: a polymer ester having a polymer backbone of a polyester structure obtained by carrying out dehydration concentration on trimethylolpropane and adipic acid, and a side chain of an ester structure obtained by carrying out dehydration concentration on an alcohol residue derived from trimethylolpropane and coconut oil fatty acid.

Polymer ester B: a polymer ester having a polymer backbone of a polyester structure obtained by carrying out dehydration concentration on pentaerythritol and adipic acid, and a side chain of ester structure obtained by carrying out dehydration concentration on an alcohol residue derived from pentaerythritol and $C_8$ to $C_{10}$ branched chain fatty acid

TABLE 1

|  | Examples | | | | | | | Comp. Example |
|---|---|---|---|---|---|---|---|---|
|  | 1 | 2 | 3 | 4 | 5 | 6 | 7 | 1 |
| Polymer ester A | 1 | 4 | — | — | — | 10 | 20 | — |
| Polymer ester B | — | — | 4 | — | — | — | — | — |
| Polymer ester C | — | — | — | 4 | — | — | — | — |
| Polymer ester D | — | — | — | — | 4 | — | — | — |
| Silicone oil | | | | | 20 | | | |
| Synthetic ester oil | | | | | 2.5 | | | |
| Mineral oil | | | | | 2.5 | | | |
| Radical scavenger | | | | | 0.5 | | | |
| Radical auxiliary agent | | | | | 0.5 | | | |
| Solvent | 73 | | 70 | | | 64 | 54 | 74 |
| Total | | | | | 100 | | | |
| Moldability (350° C., kg) | 6 | 6 | 4 | 5 | 6 | 5 | 7 | 9 |
| Moldability (400° C., kg) | 11 | 8 | 9 | 14 | 14 | 9 | 18 | 13 |

Polymer ester A Polymer ester of trimethylolpropane, adipic acid, and fatty acid
Polymer ester B Polymer ester of pentaerythritol, adipic acid, and fatty acid
Polymer ester C Polymer estter of fumaric acid, 1-butanol, and α olefin
Polymer ester D Polymer ester of fumaric acid, 2-ethylhexanol, and α olefin Examples 8 and 9, and Comparative Example 2

(Preparation of Aqueous Mold Release Agent Composition)

Aqueous mold release agents of Examples 8 and 9, and Comparative example 2 were prepared with the components (mass %) shown in Table 2. The mold releasability of each Polymer ester C: a polymer ester having a polymer backbone of a copolymer obtained by addition polymerization of fumaric acid and $C_{10}$ to $C_{16}$ α olefin and a side chain of an ester structure obtained by carrying out dehydration concentration on carboxylic acid of fumaric acid and 1-butanol Polymer ester D: a polymer ester having a polymer backbone of a copolymer obtained by addition polymerization of fumaric acid and $C_{10}$ to $C_{16}$ α olefin and a side chain of an ester structure obtained by carrying out dehydration concentration on carboxylic acid of fumaric acid and 2-ethylhexanol Each polymer ester has a molecular weight and kinematic viscosity shown below.

TABLE 3

|  | Polymer ester A | Polymer ester B | Polymer ester C | Polymer ester D |
|---|---|---|---|---|
| Molecular weight | 60000 | 40000 | 5000 | 20000 |
| Kinematic viscosity (mm$^2$/s, 100° C.) | 1000 | 300 | 300 | 3000 |
| Claim scope | | | | |
| Molecular weight of polymer ester | 3000~160,000, preferably 10,000~100,000, more preferably 40,000~80,000 | | | |
| scope of kinematic viscosity (at 100° C.) | 100~5000, preferably 200~2000, more preferably 200~1000 | | | |
| Content of polymer ester | 0.1~20%, preferably 0.1~10%, more preferably 1~5% ※20% or more of content causes poor liquid stability, thus is not suitable | | | |

Details of each component in Tables 1 and 2 are as follows. Silicone oil: dimethyl silicone (kinematic viscosity (25° C.): 1000 mm$^2$/s) Synthetic ester: trimethylolpropane trioleate Mineral oil: mineral oil compliant with JIS K2283 having a kinematic viscosity at 40° C. of 100 to 300 mm$^2$/s Radical scavenger: phenol-based antioxidant Radical auxiliary agent: molybdenum dialkyl dithiophosphate Solvent: paraffin (Evaluation Method of Mold Releasability)

The processes of the evaluation method are shown in FIG. 1.

As shown in FIG. 1(1), each of oily and aqueous mold release compositions of the above Examples and Comparative Examples were applied on a steel sheet of 200×200×30 mm (applied area: 100 cm$^2$). The application conditions are shown in Table 4. On the area where the mold release composition is applied, an O ring-shaped jig was placed as shown in FIG. 1(2), then molten aluminum was poured therein. The conditions of the molten aluminum are shown in Table 5. After that, the load (kg) applied when the O ring-shaped jig was moved in a horizonal direction, with a load of 9 kg being installed on the O ring-shaped jig, was measured as the mold release resistance. Regarding the oily mold release agent compositions, the mold release resistance at 350° C. and 400° C. of steel sheet temperature was measured. Regarding the aqueous mold release agent compositions, the mold release resistance at 300° C. a of steel sheet temperature was measured. The results for each temperature are shown in Tables 1 and 2. The smaller the mold release resistance is, the higher the mold releaseability is.

TABLE 4

|  | Oily | Aqueous |
|---|---|---|
| Distance between nozzle and steel sheet (mm) | 200 | 200 |
| Liquid pressure (MPa) | 0.1 | 0.1 |
| Discharge pressure (MPa) | 0.2 | 0.2 |
| Application amount (ml/each time) | 0.2 | 2 |

TABLE 5

| Temperature of molten metal (° C.) | 680 |
|---|---|
| Height of molten metal (mm) | 300 |
| Supply amount (ml) | 100 |

Regarding the oily mold release agent compositions, all of Examples had improved mold releasability at the steel temperature of 350° C., compared to Comparative Example 1 which does not include polymer ester. At the steel sheet temperature of 400° C., some of Examples (Examples 4, 5 and 7) did not have an improved mold releasability compared to Comparative Examples. Other Examples had an improved mold releasability compared to Comparative Examples. Regarding aqueous mold release agent composition, all Examples had improved mold releasabilities at the steel sheet temperature of 300° C., compared to Comparative Example 2 not including polymer ester.

INDUSTRIAL APPLICABILITY

According to the mold release agent composition of the present disclosure, good mold releasability is realized even when the mold temperature is high. Therefore, a good mold releasability can be sustained even when the mold temperature increases by shortening the cycle time in die casting. Accordingly, it is possible to further exert the advantage of die casting with which a large number of products are produced in a short time.

The invention claimed is:

1. A mold release agent composition for die casting comprising a hydrocarbon solvent and a polymer ester,
   wherein a content of the hydrocarbon solvent, on the basis of the total mass of the mold release agent composition, is no less than 40 mass %, and
   wherein the polymer ester includes, as a structural unit, a dibasic acid, a monobasic acid, and a polyhydric alcohol, having a polymer backbone of a polyester structure obtained by carrying out dehydration condensation on the dibasic acid and the polyhydric alcohol, and a polymer side chain of an ester structure obtained by carrying out dehydration condensation on an alcohol residue derived from the polyhydric alcohol and the monobasic acid, and the content of the polymer ester is, on the basis of the total mass of the mold release agent composition, 0.1 to 20 mass %.

2. A mold release agent composition comprising a hydrocarbon solvent and a polymer ester,
   wherein a content of the hydrocarbon solvent, on the basis of the total mass of the mold release agent composition, is no less than 40 mass %, and
   wherein the polymer ester includes, as a structural unit, a dibasic acid, a monohydric alcohol, and α olefin, the dibasic acid is an unsaturated dicarboxylic acid, the polymer ester includes a polymer backbone obtained by copolymerization by addition polymerization of the unsaturated dicarboxylic acid and α olefin, and includes a polymer side chain of an ester structure obtained by dehydration condensation of the carboxylic acid of the unsaturated dicarboxylic acid and the monohydric alcohol.

3. The mold release agent composition according to claim 2, wherein the content of the polymer ester is, on the basis of the total mass of the mold release agent composition, 0.1 to 20 mass %.

4. The mold release agent composition according to claim 1, wherein the polymer ester has a weight average molecular weight of 3,000 to 160,000.

5. The mold release agent composition according to claim 1, wherein the polymer ester has a kinematic viscosity at 100° C. of 100 to 5,000 mm²/s.

6. The mold release agent composition according to claim 1, wherein the mold release composition further includes a silicone oil, and the content of the silicone oil is, on the basis of the total mass of the mold release agent composition, no more than 50 mass %.

7. A die casting method comprising a step of applying the mold release agent composition according to claim 1 to a mold via spray nozzles, having an application amount of the mold release agent composition of 0.00005 ml/cm² to 0.1 ml/cm².

8. The mold release agent composition according to claim 2, wherein the polymer ester has a weight average molecular weight of 3,000 to 160,000.

9. The mold release agent composition according to claim 2, wherein the polymer ester has a kinematic viscosity at 100° C. of 100 to 5,000 mm²/s.

10. The mold release agent composition according to claim 2, wherein the mold release agent composition further includes a silicone oil, and the content of the silicone oil is, on the basis of the total mass of the mold release agent composition, no more than 50 mass %.

11. A die casting method comprising a step of applying the mold release agent composition according to claim 2 to a mold via spray nozzles, having an application amount of the mold release agent composition of 0.00005 ml/cm² to 0.1 ml/cm².

\* \* \* \* \*